(12) United States Patent
Park (10) Patent No.: US 6,320,766 B1
(45) Date of Patent: Nov. 20, 2001

(54) POWER-SAVING CIRCUIT FOR AN AC/DC ADAPTOR FOR A PORTABLE COMPUTER

(75) Inventor: Cheol Jin Park, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/736,398

(22) Filed: Dec. 15, 2000

(30) Foreign Application Priority Data

Jul. 31, 2000 (KR) .............................................. 2000-44394

(51) Int. Cl.[7] .................................................. H02M 3/335
(52) U.S. Cl. ........................................... 363/21.09; 363/97
(58) Field of Search ................................. 363/20, 21.01, 363/21.04, 21.09, 21.1, 97

(56) References Cited

U.S. PATENT DOCUMENTS

| 4,669,036 | * | 5/1987 | Cowett | 363/21 |
| 4,731,720 | * | 3/1988 | Takahashi | 363/21 |
| 5,289,101 | * | 2/1994 | Furuta et al. | 363/21 |
| 5,291,385 | * | 3/1994 | Vinciarelli | 363/20 |
| 5,856,739 | * | 1/1999 | Trica | 363/21 |
| 5,896,278 | * | 4/1999 | Tamura et al. | 363/20 |

FOREIGN PATENT DOCUMENTS

| 09-098571 | 4/1997 | (JP) | H02M/3/28 |
| 09-117134 | 5/1997 | (JP) | H02M/3/28 |
| 11-122920 | 4/1999 | (JP) | H02M/3/28 |
| 95-030450 | 11/1995 | (KR) | H02M/1/00 |
| 95-016289 | 6/1995 | (KR) | H04N/5/63 |
| 97-055160 | 7/1997 | (KR) | H02M/3/28 |

* cited by examiner

Primary Examiner—Jeffrey Sterrett
(74) Attorney, Agent, or Firm—Robert E. Bushnell, Esq.

(57) ABSTRACT

A power saving circuit of an AC/DC adaptor for a portable computer including an input until converting an AC voltage into a DC voltage; a power transistor; a transformer inputting the DC voltage and inducing an AC voltage based on the state of the power transistor; an output unit converting the AC voltage into a DC voltage; a feedback unit producing a feedback voltage based on an output voltage of the output unit; a driver outputting a PWM control signal to the power transistor based on the feedback voltage; an output load sensor outputting a sensing signal if a sensed load of the output unit is below a predetermined level; an output voltage dropping unit dropping an output voltage of the output unit based on the sensed signal; and a switching frequency reducer reducing a switching frequency of the PWM control signal based on the sensing signal.

24 Claims, 4 Drawing Sheets

POWER-SAVING CIRCUIT FOR AN AC/DC ADAPTOR FOR A PORTABLE COMPUTER

CLAIM OF PRIORITY

This application makes reference to, incorporates the same herein, and claims all benefits accruing under 35 U.S.C. §119 from an application entitled A POWER-SAVING CIRCUIT IN A AC/DC ADAPTER USED A MOBILE COMPUTER earlier filed in the Korean Industrial Property Office on the $31^{st}$ day of July 2000, and there duly assigned Serial No. 2000-44394.

BACKGROUND OF THE INVENTION

1. Field of the Invention

The present invention relates to an alternating/direct current (AC/DC) adaptor of a device, such as a portable computer, and more particularly to a power-saving circuit of an AC/DC adaptor for a device, such as a portable computer, capable of minimizing the power consumption of the AC/DC adaptor in a power-saving mode of the portable computer.

2. Description of the Related Art

In general, an AC/DC adaptor for a portable computer is a device which receives commercial alternating current (AC ) power, converts the AC power into a certain direct current (DC) voltage, and supplies the DC voltage to the portable computer. While the portable computer is widely used, technology relating to the AC/DC adaptor has rapidly advanced recently.

Figure 1:
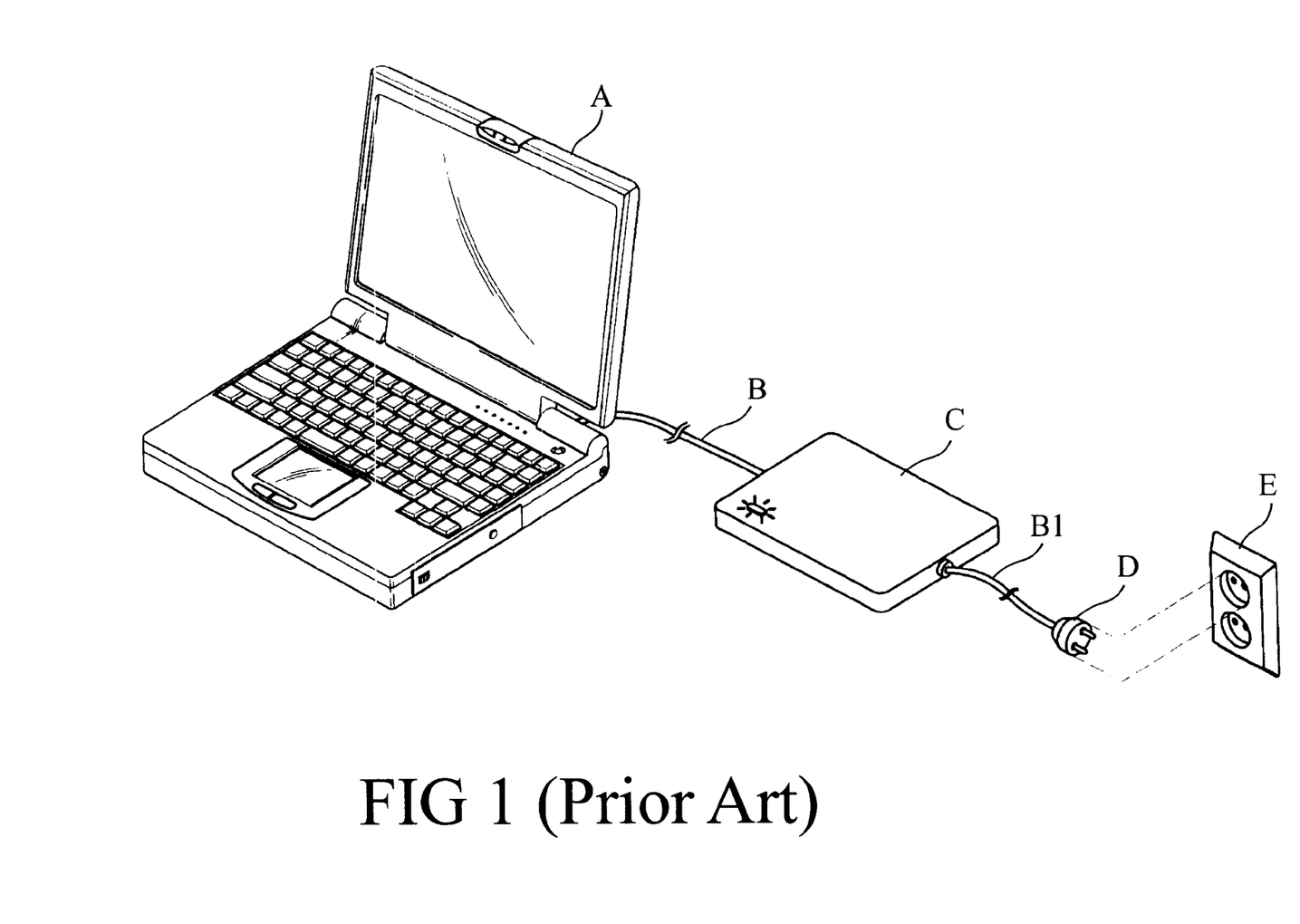
FIG. 1 is a perspective view for explaining an AC/DC adaptor of a portable computer.

FIG. 1 is a view for explaining an AC/DC adaptor for a portable computer A. The portable computer A is connected by line B to an AC/DC adaptor C, the AC/DC adaptor C being connected by line B1 to a plug D which engages an AC external power source outlet E. In case of a portable computer using a thin film transistor liquid crystal display (TFT-LCD), a DC voltage of 14V is required in general, so the AC/DC adaptor C receives the commercial AC power supply of 110V or 220V, converts the AC power supply into a DC voltage of 14V, and supplies the DC voltage to the portable computer A.

Figure 2:
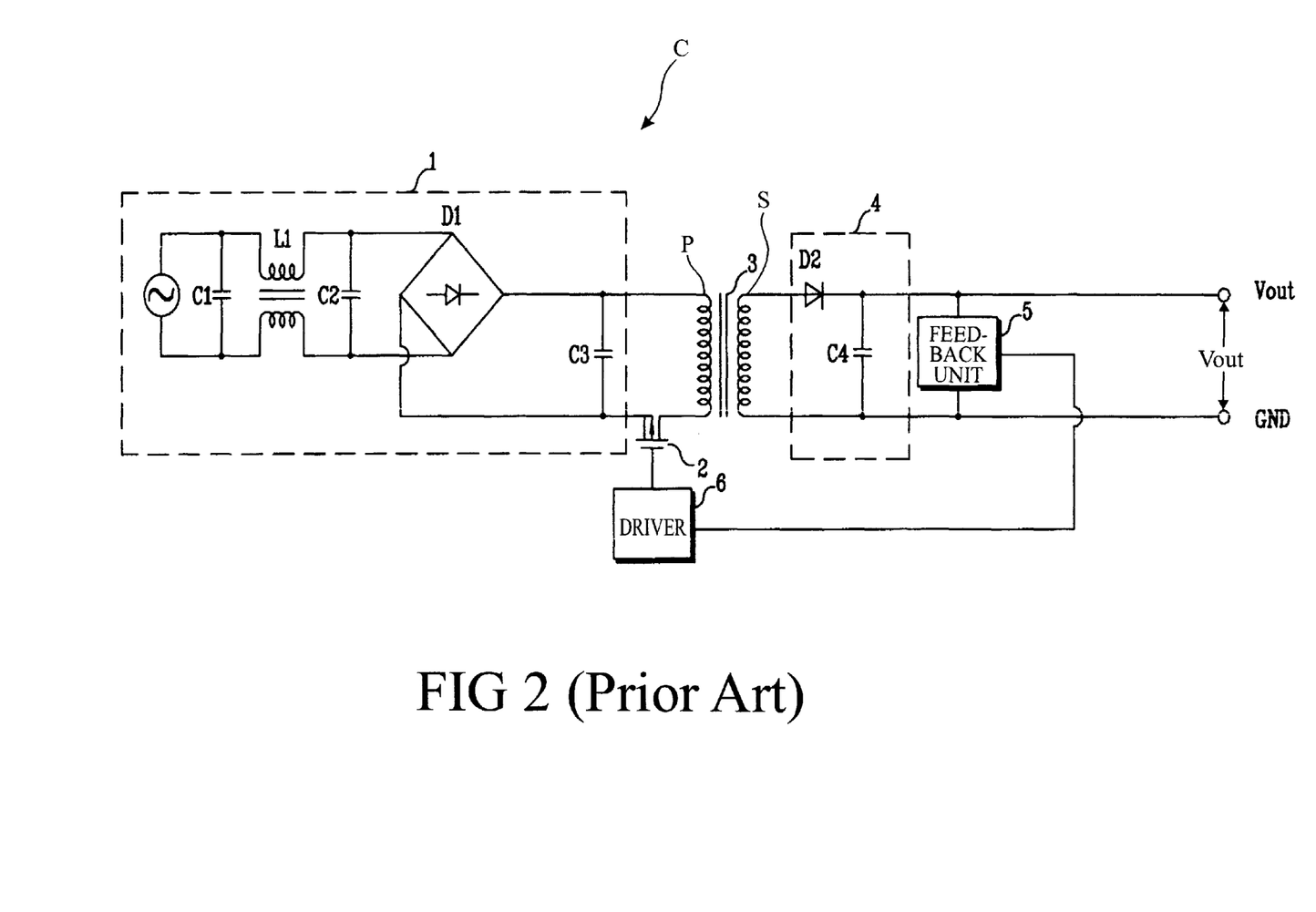
FIG. 2 is a circuit illustrating a conventional AC/DC adaptor of a portable computer.

FIG. 2 is a circuit diagram for showing a conventional AC/DC adaptor, such as AC/DC adaptor C of FIG. 1, for a portable computer, such as portable computer A of FIG. 1. The conventional AC/DC adaptor C for a portable computer in FIG. 2 is constituted by an input unit 1, a power transistor 2, a transformer 3, an output unit 4, a feedback unit 5, and a driver 6. Operation of the conventional AC/DC adaptor C for a portable computer A will now be described with reference to FIG. 2. First of all, a commercial AC power supply of 100V or 220V is applied to the input unit 1. The input unit 1 converts the AC power supply into a DC voltage through an LC filter of capacitors C1, C2, and an inductance L1, a bridge diode D1, and a smoothing capacitor C3, and supplies the DC voltage to the primary coil P of the transformer 3.

Continuing with reference to FIG. 2, at this time, if the power transistor 2 repeatedly switches on and off based on a pulse width modulation (PWM) control signal input from the driver 6, an induced electromotive force from the primary coil P to the secondary coil S of the transformer 3 is generated. An AC voltage output from the secondary coil S of the transformer 3 is converted into a certain DC voltage ($V_{out}$) of, in general, 14V through a rectifying diode D2 and a smoothing capacitor C4 of the output unit 4, and the DC voltage is applied to a portable computer, such as portable computer A of FIG. 1.

Further, with reference to FIG. 2, also at this time, a feedback unit 5 is, in general, provided to the AC/DC adaptor C for maintaining the output voltage of the output unit 4 at a certain voltage. air That is, the feedback unit 5 produces a feedback voltage based on the output voltage of the output unit 4 and outputs the feedback voltage to the driver 6. The driver 6 compares the feedback voltage with a reference voltage, produces the PWM control signal, and supplies the PWM control signal to the power transistor 2, so that the power transistor 2 is switched on and off. Accordingly, the output voltage of the AC/DC adaptor C is maintained at a constant voltage all the time to be supplied to a portable computer, such as portable computer C of FIG. 1.

In general, if a user does not use a portable computer and the portable computer is also not turned off, the portable computer typically recognizes the state and reduces the power consumption of the portable computer itself to below a certain level, and, a display used by a user just before such power reduction typically appears automatically and instantly when the user wishes to again use the portable computer, differently from a turnoff of the power for the portable computer, as in the prior art. Such a portable computer having a power-saving function is realized with a display power management system (DPMS) according to a standard plan of the Video Electronics Standard Association (VESA), for example.

However, even though a portable computer carries out the power-saving mode, a conventional AC/DC adaptor for a portable computer is normally operated to supply a rating voltage to the portable computer, which can cause an unnecessary power loss in the AC/DC adaptor itself.

SUMMARY OF THE INVENTION

Accordingly, in order to solve the above problem, it is an object, among other objects, of the present invention to provide a power-saving circuit of an AC/DC adaptor for a portable computer, that drops down or lowers an output voltage in a power-saving mode of the portable computer while reducing a switching frequency of a power transistor.

In order to achieve the above object and other objects of the present invention, a power-saving circuit of an AC/DC adaptor for a portable computer, according to the present invention, includes an input unit for inputting a commercial AC voltage from an external AC voltage or power source and for converting the AC voltage into a DC voltage; a power transistor selectively switched on and offbased on a PWM control signal; a transformer for inputting the DC voltage from the input unit to a primary coil of the transformer and inducing an AC voltage at a secondary coil of the transformer based on a switch-on state and a switch-off state of the power transistor; an output unit for converting the AC voltage from the secondary coil of the transformer into a DC voltage to be output to a device, such as a portable computer; a feedback unit for producing a feedback voltage based on an output voltage of the output unit; and a driver for outputting to the power transistor the PWM control signal having a duty ratio controlled based on the feedback voltage from the feedback unit. The power-saving circuit of the present invention further includes an output load sensor for outputting a sensing signal if a sensed load of the output unit is below a predetermined level; an output voltage dropping unit for receiving the sensing signal when output by the output load sensor and for dropping an output voltage of the output unit based on the sensing signal when the sensing signal is received by the output voltage dropping unit; and a switching frequency reducer for receiving the sensing signal when output by the output load sensor and for reducing a switching frequency of the PWM control signal produced from the driver based on the sensing signal when the sensing signal is received by the switching frequency reducer.

Further, in order to achieve the above object among other objects of the present invention, another embodiment of a power-saving circuit of an AC/DC adaptor for a portable computer, according to the present invention, includes an input unit for inputting a commercial AC voltage from an external AC voltage or power source and for converting the AC voltage into a DC voltage; a power transistor selectively switched on and off based on a PWM control signal; a transformer for inputting the DC voltage from the input unit to a primary coil of the transformer and inducing an AC voltage at a secondary coil of the transformer based on a switch-on state and a switch-off state of the power transistor; a main voltage output unit for converting the AC voltage from a first secondary coil of the transformer into a DC voltage to be output to a device, such as a portable computer; a feedback unit for producing a feedback voltage based on one of an output voltage of the main voltage output unit and an output voltage of an auxiliary voltage output unit; and a driver for outputting to the power transistor the PWM control signal having a duty ratio controlled based on the feedback voltage from the feedback unit. This embodiment of the power-saving circuit according to the present invention further includes an output load sensing unit for sensing a load of one of the main voltage output unit and the auxiliary voltage output unit and outputting a sensing signal if the sensed load is below a predetermined level; an output voltage dropping unit for receiving the sensing signal when output by the output load sensing unit and when the sensing signal is received by the output voltage dropping unit for dropping an output voltage of the main voltage output unit based on the sensing signal when the sensing signal is received by the output voltage dropping unit; a switching frequency reducer for receiving the sensing signal when output by the output load sensing unit and for reducing a switching frequency of the PWM control signal produced from the driver based on the sensing signal when the sensing signal is received by the switching frequency reducer; the auxiliary voltage output unit for converting an AC voltage input from a second secondary coil of the transformer into a DC voltage and outputting the DC voltage of the auxiliary voltage output unit to the portable computer; and a main switching unit selectively switched on and off based on the sensing signal to selectively cut off DC the output voltage of the main voltage output unit when the sensing signal is output by the output load sensing unit and to selectively supply the output DC voltage of the auxiliary voltage output unit when the sensing signal is output by the output load sensing unit.

Accordingly, in the present invention if an output load of an AC/DC adaptor is reduced below a predetermined value, a portable computer carries out a power-saving mode to drop down an output voltage of an AC/DC adaptor as well as to reduce a switching frequency of a power transistor, so that the power consumption of the AC/DC adaptor is minimized in a power-saving mode of the portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE PREFERRED EMBODIMENTS

Hereinafter, A/C adaptors having a power-saving circuit according to embodiments of the present invention will be described in detail with reference to the accompanying drawings. In this regard, FIG. 3 illustrates a power-saving circuit of an AC/DC adaptor 100 of a portable computer, such as portable computer A of FIG. 1, according to a first embodiment of the present invention, and FIG. 4 illustrates a power-saving circuit of an AC/DC adaptor 100A of a portable computer, such as portable computer A of FIG. 1, according to a second embodiment of the present invention.

Figure 3:
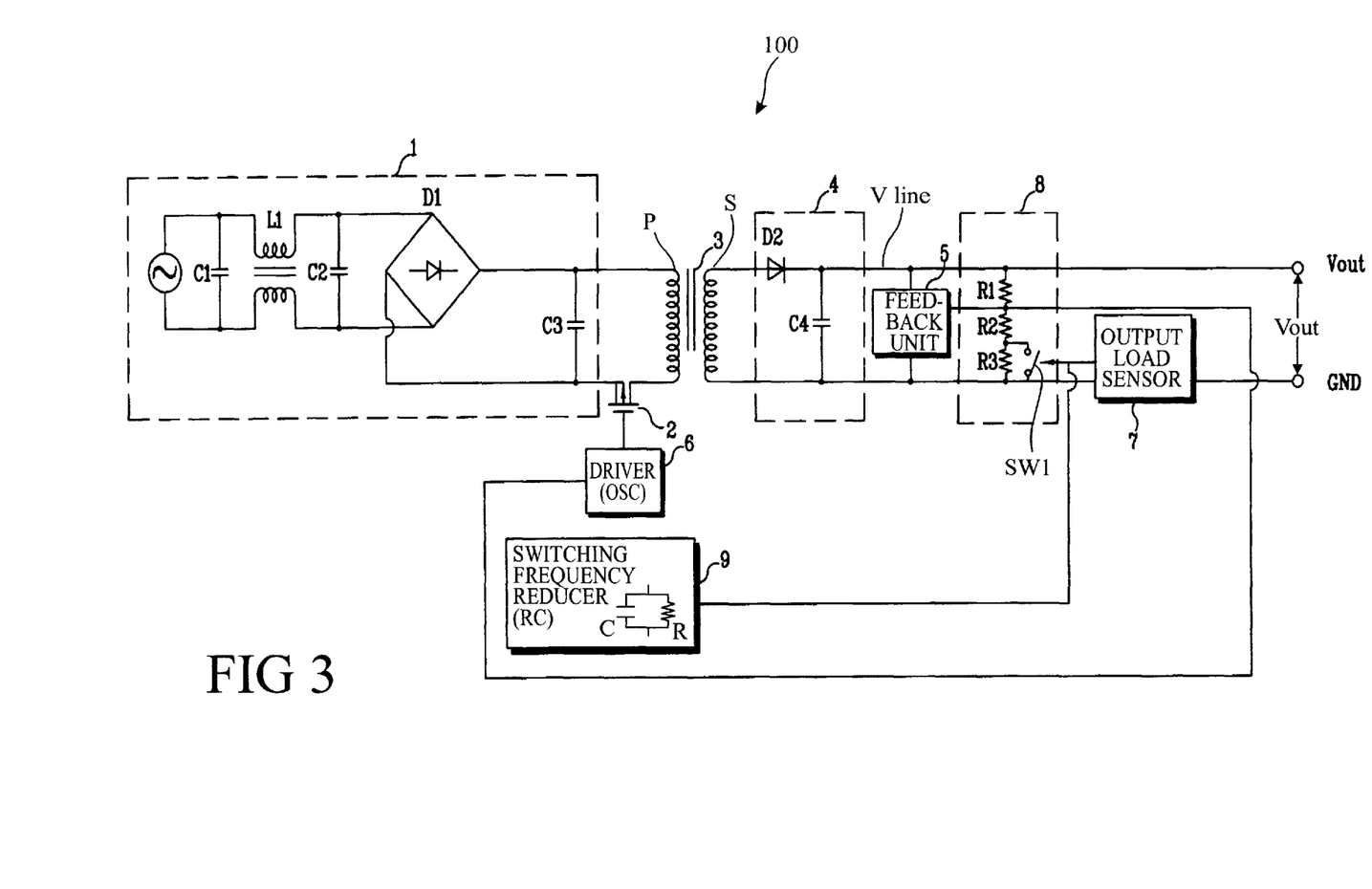
FIG. 3 is a view illustrating a power-saving circuit of an AC/DC adaptor of a portable computer according to a first embodiment of the present invention.
Figure 4:
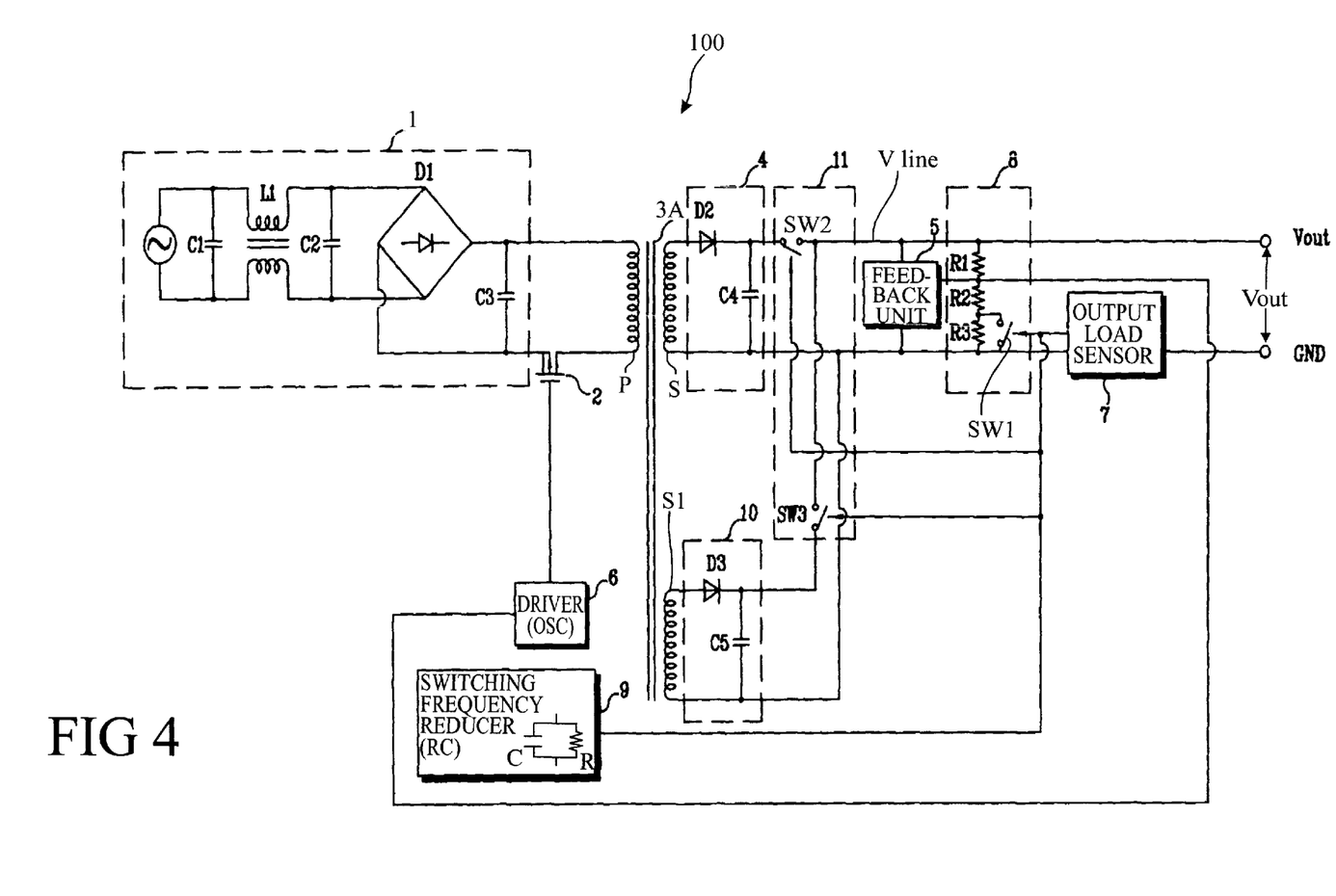
FIG. 4 is a view illustrating a power-saving circuit of an AC/DC adaptor of a portable computer according to a second embodiment of the present invention.

Referring now to FIG. 3, FIG. 3 illustrates the AC/DC adaptor 100 including an input unit for inputting a commercial AC voltage from an external AC voltage source and for converting the AC voltage into a DC voltage. Input unit 1, similar to input unit 1 of FIG. 2, converts an AC power supply into a DC voltage through an LC filter of capacitors C1, C2, and an inductance L1, a bridge diode D1, and a smoothing capacitor C3, and supplies the DC voltage to the primary coil P of the transformer 3. Also, the AC/DC adaptor 100 includes a power transistor 2 that is selectively switched on and off based on a pulse width modulation (PWM) control signal; the transformer 3 for inputting the DC voltage from the input unit 1 to a primary coil P of the transformer 3 and inducing an AC voltage at a secondary coil S of the transformer 3 based on the selective switch-on state and switch-off state of the power transistor 2. The AC/DC adaptor 100 also includes an output unit 4 including a diode D2 and a capacitor C4 for converting the AC voltage from the secondary coil S of the transformer 3 into a DC voltage to be output to a portable computer, such as portable computer A of FIG. 1; includes a feedback unit 5 for producing a feedback voltage based on an output voltage of the output unit 4; and includes a driver 6 for outputting to the power transistor 2 the PWM control signal having a duty ratio controlled based on the feedback voltage of the feedback unit 5.

Further the AC/DC adaptor 100 of FIG. 3 according to a first embodiment of the present invention further includes an output load sensor 7 for outputting a sensing signal if a sensed load of the output unit 4 is below a predetermined level; includes an output voltage dropping unit 8 for dropping an output voltage of the output unit 4 based on the sensing signal; and includes a switching frequency reducer 9 for reducing a switching frequency of the PWM control signal produced from the driver 6 based on the sensing signal from the output load sensor 7.

The output voltage dropping unit 8 includes at least one or more resistors R1, R2, and R3 connected between an output line $V_{line}$ of the output unit 4 and the ground GND; and includes a the switching device SW1 connected in parallel with at least one or more resistors R1, R2, and R3, and the switching device SW1 is switched off when the sensing signal is input to the output voltage dropping unit 8 during maintaining a switch-on state of the switching device SW1 in a normal operation mode of the AC/DC adaptor 100.

Continuing with reference to FIG. 4, FIG. 4 illustrates an AC/DC adaptor 100A according to a second embodiment of the present invention, similar to AC/DC adaptor 100 of FIG. 3, AC/DC adaptor 100A includes the input unit 1 for inputting a commercial AC voltage from external AC voltage source and converting the AC voltage into a DC voltage; the power transistor 2 that is selectively switched on and offbased on a PWM control signal; a transformer 3A having the primary coil P and a first secondary coil S and a second secondary coil S1 for inputting the DC voltage from the input unit 1 and inducing an AC voltage at a corresponding secondary coil S, S1 based on a switch-on state and a switch-off state of the power transistor 2; a main voltage output unit 4, similar to output unit 4 of FIG. 3, for converting the AC voltage input from the first secondary coil S of the transformer 3A into a DC voltage to be output to a portable computer, such as portable computer A of FIG. 1; the feedback unit 5 for producing a feedback voltage based on an output voltage of the main voltage output unit 4 or based on an output voltage of an auxiliary voltage output unit 10; and the driver 6 for outputting to the power transistor 2 a PWM control signal having a duty ratio controlled based on the feedback voltage of the feedback unit 5.

Also, the AC/DC adaptor 100A of FIG. 4 according to the second embodiment of the present invention, similar to the AC/DC adaptor 100 of FIG. 3 includes an output load sensing unit 7 similar to output load sensor 7 of FIG. 3, for sensing a load of the main voltage output unit 4 or a load of the auxiliary voltage output unit 10 and outputting a sensing signal if the sensed load is below a predetermined level; includes the output voltage dropping unit 8 for dropping an DC output voltage of the main voltage output unit 4 or an output DC voltage of the auxiliary voltage output unit 10 based on the sensing signal; and includes the switching frequency reducer 9 for reducing a switching frequency of the PWM control signal produced from the driver 6 based on the sensing signal.

However, the AC/DC adaptor 100A of FIG. 4 further includes the auxiliary voltage output unit 10 including a diode D3 and a capacitor C5 for converting an AC voltage input from the second secondary coil S1 of the transformer 3A into a DC voltage and outputting the DC voltage to the portable computer, such as portable computer A of FIG. 1; and also includes a main switching unit 11 that is selectively switched on and off based on the sensing signal from the output load sensing unit 7 to cut off the output DC voltage of the main voltage output unit 4 so as to supply the output DC voltage of the auxiliary voltage output unit 10.

Moreover, as in the AC/DC adaptor 100 of FIG. 3, the output voltage dropping unit 8 of AC/DC adaptor 100A of FIG. 4 has at least one or more resistors R1, R2, and R3 connected between an output line $V_{line}$ of the main voltage output unit 4 and of the auxiliary voltage output unit 10 and the ground GND; and includes a first switching unit SW1, similar to switching device SW1 of the output voltage dropping unit 8 of FIG. 3, connected in parallel with at least one or more resistors R1, R2, and R3, and the first switching unit SW1 is switched off if the sensing signal is input to the output voltage dropping unit 8 during maintaining a switch-on state of the first switching unit SW1 in a normal operation mode of the AC/DC adaptor 100A.

Further, in the embodiment of the AC/DC adaptor 100A of FIG. 4, the main switching unit 11 includes a second switching unit SW2 that is selectively switched off to cut off the output DC voltage of the main voltage output unit 4 if the sensing signal from the output load sensing unit 7 is input to the main switching unit 11 during maintaining a switch-on state of the second switching unit SW2 in a normal operation mode of the AC/DC adaptor 100A; and also includes a third switching unit SW3 that is selectively switched on to supply the output DC voltage of the auxiliary voltage output unit 10 if the sensing signal from the output load sensing unit 7 is input to the main switching unit 11 during maintaining a switch-off state of the third switching unit SW3 in the normal operation mode of the AC/DC adaptor 100A.

The operation of the power-saving circuits of the AC/DC adaptors 100, 100A according to the first and second embodiments of FIGS. 3 and 4, respectively, of the present invention will now be described.

First, referring to the embodiment of the AC/DC adaptor 100 of FIG. 3, when a portable computer, such as portable computer A of FIG. 1, is in a normal operation mode, the AC/DC adaptor 100 according to the present invention has a similar operation as a conventional AC/DC adaptor as described above, such as described previously with respect to the AC/DC adaptor C of FIG. 2.

However, in the AC/DC adaptor 100 of FIG. 3, when the portable computer, such as portable computer A of FIG. 1, is in a power-saving mode and not in a normal operation mode, an output load of the AC/DC adaptor 100 is reduced, so the output load sensor 7 senses the reduced output load and outputs a sensing signal to the output voltage dropping unit 8 and to the switching frequency reducer 9. The output load sensor 7 can be a current sensor, for example. Accordingly, the output voltage dropping unit 8 drops the output DC voltage of the output unit 4 based on the sensing signal received from the output load sensor 7, and the switching frequency reducer 9 reduces a switching frequency of the PWM control signal produced from the driver 6 based on the sensing signal received from the output load sensor 7.

Continuing with reference to FIG. 3, describing the operations of the output voltage dropping unit 8, the switching device SW1 maintains a switch-on state in a normal operation mode of the AC/DC adaptor 100 so an output voltage of the output unit 4 is divided by the first resistor R1 and the second resistor R2 to be output to the portable computer, such as portable computer A of FIG. 1. However, when the portable computer, such as portable computer A of FIG. 1, is in the power-saving mode, if a sensing signal is input from the output load sensor 7 to the output voltage dropping unit 8, the switching device SW1 is switched off so that the output voltage of the output unit 4 is divided by the first, second, and third resistors R1, R2, and R3 to be output to the portable computer, such as portable computer A of FIG. 1. Accordingly, the output voltage of the output unit 4 is dropped or lowered in the power-saving mode of the AC/DC adaptor 100 from the output voltage in the normal operation mode can be based on the following formula 1(a) of the following Formula 1, for example, so the consumption of power is reduced.

Formula 1

Formula 1(a): $V_{out}=V_{ref}* (1+R1/(R2+R3))$

Formula 1(b): $P_{out}=LI^2f/2$

In the above Formula, in Formula 1(a), $V_{out}$ is the voltage output from the AC/DC adaptor 100, 100A of FIGS. 3 and 4, respectively, and $V_{ref}$ being a reference voltage for the AC/DC adaptor 100, 100A, respectively, with R1, R2 and R3 each being a resistor or a resistance of the output voltage dropping unit 8 of the AC/DC adaptor 100, 100A. Also, in the formula 1(b) of Formula 1, $P_{out}$ is the consumption power output by the AC/DC adaptor 100, 100A of FIGS. 3 and 4, respectively, with L being an inductive load of the AC/DC adaptor 100, 100A, I being the current of the AC/DC adaptor 100, 100A, and f being the switching frequency of the power transistor 2 of the AC/DC adaptor 100, 100A of FIGS. 3 and 4, respectively.

Continuing again with reference to FIG. 3, further, when the sensing signal is input to the switching frequency reducer 9, the switching frequency reducer 9 is connected to an oscillator OSC built in the driver 6 and reduces a switching frequency output from the oscillator OSC. The switching frequency reducer 9 includes an RC network of a resistor R and a capacitor C for reducing the switching frequency output from the oscillator OSC, the resistor R and the capacitor C of the RC network being diagrammatically illustrated by (RC) in the switching frequency reducer 9 of FIG. 3. Accordingly, the switching frequency of the power transistor 2 is reduced or lowered in the power-saving mode from the switching frequency in the normal operation mode, so the consumption power $P_{out}$ is also reduced based on the above formula 1(b), for example. That is, in accordance with the above formula 1(b), the consumption power $P_{out}$ is reduced as the switching frequency f is reduced. The following Table 1 illustrates an experimental measurement result of the consumption power reduction according to the switching frequency reduction in accordance with the present invention.

TABLE 1

| | | power consumption (Pout) | |
|---|---|---|---|
| | output voltage (Vout) | switching frequency (f) 65 kHz | switching frequency (f) 18 kHz |
| IBM 15" LCD monitor | 12 V | 2.50 W | 1.96 W |
| " | 6.2 V | 1.51 W | 1.15 W |
| SyncMaster 570B | 12 V | 1.60 W | 1.22 W |
| " | 6.2 V | 1.24 W | 0.80 W |

As shown in above Table 1, when an IBM 15" LCD monitor is used and a switching frequency f output from an oscillator OSC of driver 6 in a normal operation mode is 65 kHz, the power consumption $P_{out}$ of 2.50W is consumed, and when the switching frequency f reduced by the switching frequency reducer 9 in the power saving mode is 18 kHz, the power consumption $P_{out}$ of 1.96W is consumed, so the power consumption is reduced in the power saving mode from the power consumption in the normal operation mode of of an AC/DC adaptor of the present invention.

Referring now to the second embodiment of the AC/DC adaptor 100A of FIG. 4, when a portable computer, such as portable computer A of FIG. 1, is in a normal operation mode, the AC/DC adaptor 100A according to the present invention has the same operations as a conventional AC/DC adaptor as described above, such as described previously with respect to the AC/DC adaptor C of FIG. 2.

However, when that a portable computer, such as portable computer A of FIG. 1, is in a power saving mode, an output load of the AC/DC adaptor 100A is reduced. Accordingly, the output load sensing unit 7 senses the output load and then outputs a sensing signal to the output voltage dropping unit 8, to the switching frequency reducer 9, and to the main switching unit 11. The output load sensing unit 7 can be a current sensor, for example. Accordingly, the output voltage dropping unit 8 drops the output DC voltage of the main voltage output unit 4 or the output DC voltage of the auxiliary voltage output unit 10 based on the sensing signal received from the output load sensing unit 7, the switching frequency reducer 9 reduces a switching frequency of the PWM control signal produced from the driver 6 based on the sensing signal received from the output load sensing unit 7 and the main switching unit 11 cuts off the output DC voltage of the main voltage output unit 4 based on the sensing signal to supply the output DC voltage of the auxiliary voltage output unit 10.

Continuing with reference to FIG. 4, describing the operations of the output voltage dropping unit 8, the first switching unit SW1 maintains a switch-on state in a normal operation, so an output DC voltage of the main voltage output unit 4 is divided by the first resistor R1 and the second resistor R2 to be output to the portable computer, such as portable computer A of FIG. 1. However, when the portable computer, such as portable computer A of FIG. 1, is in the power saving mode, if the sensing signal is input from the output load sensing unit 7, the first switching unit SW1 is switched off so that the output voltage DC of the main voltage output unit 4 is divided by the first, second, and third resistors R1, R2, and R3 to be output to the portable computer, such as portable computer A of FIG. 1. Accordingly, the output DC voltage of the main voltage output unit 4 or the output DC voltage of the auxiliary voltage output unit 10 is dropped or lowered in the power saving mode from that in the normal operation mode based on the above formula 1(a), so the consumption of power for the AC/DC adaptor 100A is reduced.

Continuing with reference to FIG. 4, further, if the sensing signal is input to the switching frequency reducer 9, the switching frequency reducer 9 is connected to an oscillator OSC built in the driver 6 and reduces a switching frequency output from the oscillator OSC. The switching frequency reducer 9 includes an RC network of a resistor R and a capacitor C for reducing the switching frequency output from the oscillator OSC in the driver 6, the resistor R and the capacitor C of the RC network being diagrammatically illustrated by (RC) in the switching frequency reducer 9 of FIG. 4. Accordingly, the switching frequency of the power transistor 2 is reduced or lowered in the power saving mode from the switching frequency in the normal operation mode of the AC/DC adaptor 100A, so the consumption power $P_{out}$ is also reduced based on above formula 1(b), for example.

Further, with respect to the AC/DC adaptor 100A of FIG. 4, describing the operation of the main switching unit 11, the second switching unit SW2 maintains a switch-on state and the third switching unit SW3 maintains a switch-off state in a normal operation mode of the AC/DC adaptor 100A, so an output DC voltage of the main voltage output unit 4 is supplied to the portable computer and the output DC voltage of the auxiliary voltage output unit 10 is cut off to the portable computer, such as portable computer A of FIG. 1.

However, when the portable computer, such as portable computer A of FIG. 1., is in the power saving mode, when the sensing signal is input to the main switching unit 11 from the output load sensing unit 7, the second switching unit SW2 is switched off and the third switching unit SW3 is switched on of the main switching unit 11, so the output DC voltage of the main voltage output unit 4 is cut off and the output DC voltage of the auxiliary voltage output unit 10 is supplied to the portable computer, such as portable computer A of FIG. 1. Desirably, a DC voltage output from the auxiliary voltage output unit 10 is typically smaller, generally ten times smaller than a DC voltage output from the main voltage output unit 4, with such reduction of output DC voltage being accomplished, for example, by having an appropriate number of turns of the second secondary coil S1 of the transformer 3A, so the power consumption is greatly reduced in the power saving mode than in the normal operation mode.

Therefore, in an power-saving circuit for an AC/DC adaptor according to the present invention, if a portable computer is in the power saving mode and an output load of an AC/DC adaptor is reduced below a predetermined value, an output voltage of the AC/DC adaptor is dropped or lowered as well as a switching frequency of a power transistor is reduced, so that the power consumption of the AC/DC adaptor is minimized in the power saving mode of the portable computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. An alternating current/direct current adaptor having a power-saving circuit, comprising:
    an input unit for inputting an alternating current voltage from an external alternating current voltage source and for converting the alternating current voltage into a direct current voltage;
    a power transistor selectively switched on and off based on a pulse width modulation control signal;
    a transformer for inputting the direct current voltage from the input unit to a primary coil of the transformer and for inducing an alternating current voltage at a secondary coil of the transformer based on a switch-on state and a switch-off state of the power transistor;
    an output unit for converting the alternating current voltage from the secondary coil of the transformer into a direct current voltage to be output from the output unit;
    a feedback unit for producing a feedback voltage based on the direct current voltage output of the output unit;
    a driver for outputting to the power transistor the pulse width modulation control signal having a duty ratio controlled based on the feedback voltage from the feedback unit;
    an output load sensor for outputting a sensing signal when a sensed load of the output unit is below a predetermined level;
    an output voltage dropping unit for receiving the sensing signal when output by the output load sensor and for lowering the direct current voltage output from the output unit based on the sensing signal when the sensing signal is received by the output voltage dropping unit; and
    a switching frequency reducer for receiving the sensing signal when output by the output load sensor and for reducing a switching frequency of the pulse width modulation control signal produced from the driver based on the sensing signal when the sensing signal is received by the switching frequency reducer.

2. The alternating current/direct current adaptor having a power-saving circuit as claimed in claim 1, further comprised of the alternating current/direct current adaptor being used for providing a direct current voltage to a portable computer.

3. The alternating current/direct current adaptor having a power-saving adaptor as claimed in claim 1, further comprised of the output load sensor being a current sensor.

4. The alternating current/direct current adaptor having a power-saving circuit as claimed in claim 3, further comprised of the alternating current/direct current adaptor being used for providing a direct current voltage to a portable computer.

5. The alternating current/direct current adaptor having power-saving circuit as claimed in claim 1, fute comprised of the output voltage dropping unit comprising:
    at least one resistor connected between an output line of the output unit and a ground for the alternating current/direct current adaptor; and
    a switching device connected in parallel with at the least one resistor and being selectively switched off when the sensing signal is input during the switching device maintaining a switch-on state in a normal operation mode of the alternating current/direct current adaptor.

6. The alternating current/direct current adaptor having a power-saving circuit as claimed in claim 5, further comprised of the alternating current direct current adaptor being used for providing a direct current voltage to a portable computer.

7. The alternating current/direct current adaptor having a power saving circuit as claimed in claim 1, further comprised of the switching frequency reducer being connected to an oscillator in the driver, the switching frequency reducer including a resistor and a capacitor for reducing the switching frequency output from the oscillator.

8. The alternating current/direct current adaptor having a power-saving circuit as claimed in claim 7, further comprised of the alternating current/direct current adaptor being used for providing a direct current voltage to a portable computer.

9. An alternate current/direct current adaptor having a power-saving circuit, comprising:
    an input unit for inputting an alternating current voltage from an external alternating current voltage source and for converting the alternating current voltage into a direct current voltage;
    a power transistor selectively switched on and off based on a pulse width modulation control signal;
    a transformer for inputting the direct current voltage from the input unit to a primary coil of the transformer and for inducing an alternating current voltage at a secondary coil of the transformer based on a switch-on state and a switch-off state of the power transistor;
    a main voltage output unit for converting an alternating current voltage from a first secondary coil of the transformer into a direct current voltage to be output from the main voltage output unit;
    a feedback unit for producing a feedback voltage based on one of the direct current voltage output of the main voltage output unit and a direct current voltage output of an auxiliary voltage output unit;
    a driver for outputting to the power transistor the pulse width modulation control signal having a duty ratio controlled based on the feedback voltage from the feedback unit;
    an output load sensing unit for sensing a load of one of the main voltage output unit and the auxiliary voltage output unit and outputting a sensing signal when the sensed load is below a predetermined level;
    an output voltage dropping unit for receiving the sensing signal output by the output load sensing unit and for dropping one of the direct current voltage output from the main voltage output unit and the direct current voltage output from the auxiliary voltage output unit based on the sensing signal when the sensing signal is received by the output voltage dropping unit;

a switching frequency reducer for receiving the sensing signal when output by the output load sensing unit and for reducing a switching frequency of the pulse width modulation control signal produced from the driver based on the sensing signal when the sensing signal is received by the switching frequency reducer;

the auxiliary voltage output unit for converting an alternating current voltage input from a second secondary coil of the transformer into a direct current voltage and outputting the direct current voltage from the auxiliary voltage output unit; and a main switching unit selectively switched on and off based on the sensing signal when the sensing signal is received by the main switching unit to selectively cut off the direct current voltage output from the main voltage output unit and to supply the direct current voltage output from the auxiliary voltage output unit.

10. The alternating current/direct current adaptor having a power-saving circuit as claimed in claim 9, further comprised of the alternating current/direct current adaptor being used for providing a direct current voltage to a portable computer.

11. The alternating current/direct current adaptor having a power-saving circuit as claimed in claim 9, further comprised of the output load sensing unit being a current sensor.

12. The alternating current/direct current adaptor having a power-saving circuit as claimed in claim 11, further comprised of the alternating current/direct current adaptor being used for providing a direct current voltage to a portable computer.

13. The alternating current/direct current adaptor having a power-saving circuit as claimed in claim 9, further comprised of the output voltage dropping unit comprising:

at least one resistor connected between an output line of one of the main voltage output unit and the auxiliary voltage output unit and a ground for the alternating current/direct current adaptor; and a first switching unit connected in parallel with the at least one resistor and being selectively switched off when the sensing signal is input to the output voltage dropping unit during the first switching unit maintaining a switch-on state in a normal operation mode of the alternating current/direct current adaptor.

14. The alternating current/direct current adaptor having a power-saving circuit as claimed in 13, further comprised of the alternating current/direct current adaptor being used for providing a direct current voltage to a portable computer.

15. The alternating current/direct current adaptor having a power-saving circuit as claimed in claim 13, further comprised of the main switching unit comprising:

a second switching unit selectively switched off to cut off the direct current voltage output from the main voltage output unit when the sensing signal is input to the main switching unit during the second switching unit maintaining a switch-on state in a normal operation mode of the alternating current/direct current adaptor; and a third switching unit selectively switched on to supply the direct current voltage output from the auxiliary voltage output unit when the sensing signal is input to the main switching unit during the third switching unit maintaining a switch-off state in the normal operation mode of the alternating current/direct current adaptor.

16. The alternating current/direct current adaptor having a power-saving circuit as claimed in claim 15, further comprised of the alternating current/direct current adaptor being used for providing a direct current voltage to a portable computer.

17. The alternating current/direct current adaptor having a power-saving circuit as claimed in claim 9, further comprised of the main switching unit comprising:

a first switching unit selectively switched off to cut off the direct current voltage output from the main voltage output unit when the sensing signal is input to the main switching unit during the first switching unit maintaining a switch-on state in a normal operation mode of the alternating current/direct current adaptor; and a second switching unit selectively switched on to supply the direct current voltage output from the auxiliary voltage output unit when the sensing signal is input to the main switching unit during the second switching unit maintaining a switch-off state in the normal operation mode of the alternating current/direct current adaptor.

18. The alternating current/direct current adaptor having a power saving-circuit as claimed in claim 17, further comprised of the alternating current/direct current adaptor being used for providing a direct current voltage to a portable computer.

19. The alternating current/direct current adaptor having a power-saving circuit as claimed in claim 9, further comprised of the direct current voltage output from the auxiliary voltage output unit being ten times smaller than the direct current voltage output from the main voltage output unit.

20. The alternating current/direct current adaptor having a power saving circuit is claimed in claim 19, further comprised of the alternating current/direct current adaptor being used for providing a direct current voltage to a portable computer.

21. A power saving method in an alternating current/direct current adaptor, comprising the steps of:

outputting a sensing signal by an output load sensor when a sensed load of an output unit of the alternating current/direct current adaptor for converting an alternating current voltage into a direct current voltage is below a predetermined level;

dropping by an output voltage dropping unit a direct current voltage output from the output unit when the sensing signal is output by the output load sensor; and reducing a switching frequency of a pulse width modulation control signal produced by a driver for driving a power transistor to control inducing an alternating current voltage provided to the output unit when the sensing signal is output by the output load sensor.

22. The method of claim 21, further comprised of the alternating current/direct current adaptor being used for providing a direct current voltage to a portable computer.

23. The method of claim 21, further comprising the step of selectively switching by a switching unit to cut off a direct current voltage output from a main voltage output unit as the output unit to supply a direct current voltage output from an auxiliary voltage output unit as the output unit when the sensing signal is output from the output load sensor.

24. The method of claim 23, further comprised of the alternating current/direct current adaptor being used for providing a direct current voltage to a portable computer.

* * * * *